July 21, 1953
N. LANGER
2,646,105
HEAT SEALING MACHINE
Filed April 6, 1951
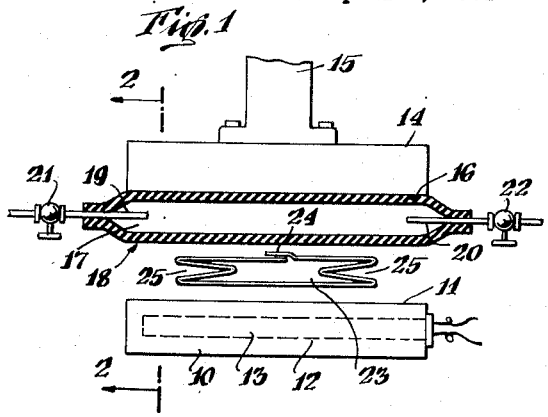
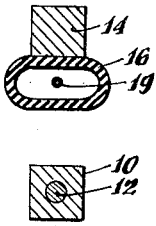
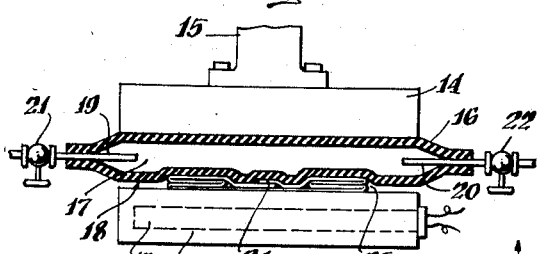
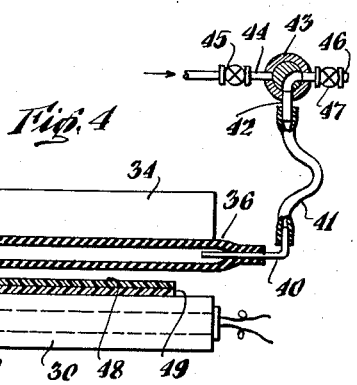
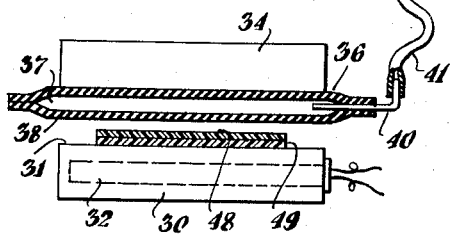
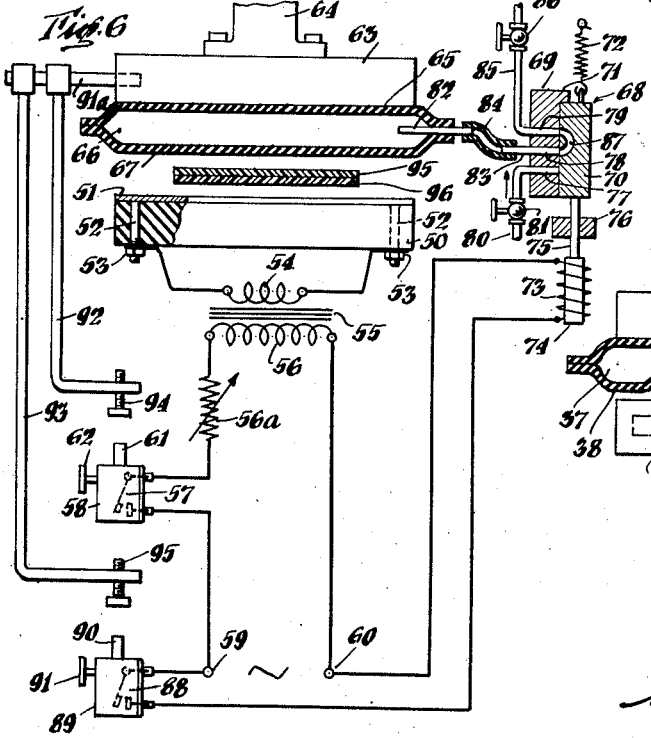
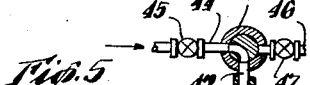
INVENTOR.
Nicholas Langer Patented July 21, 1953

2,646,105

UNITED STATES PATENT OFFICE 2,646,105

HEAT SEALING MACHINE

Nicholas Langer, New York, N. Y.

Application April 6, 1951, Serial No. 219,666

5 Claims. (Cl. 154—42)

This invention relates to the art of heat sealing, and, more particularly, to a novel and improved machine and method of heat sealing thermoplastic sheet materials formed of rubber hydrochloride, vinyl resins, polyethylene, vinyledene chloride, and the like.

Present commercial heat sealing machines generally comprise a sealing member having a sealing face adapted to be heated to heat sealing temperatures and a pressure member mounted for cooperation therewith to apply sealing heat and pressure upon the plies of thermoplastic sheet material interposed therebetween. It is customary to provide on the operating face of the pressure member a layer of elastic material, such as a thin layer of rubber, in order to impart some resiliency thereto.

Heat sealing machines of the described character have been reasonably satisfactory when operating on plies of thermoplastic sheet materials having uniform thickness throughout the sealing region. Considerable difficulties have been experienced, however, when it was desired to seal plies of such materials where the thickness of the plies or the number of the plies was different in different portions of the sealing region. This situation arises, for example, when sealing across gusseted tubular stock or across gusseted bags of thermoplastic sheet material in which case the number of plies or layers to be sealed or bonded together may vary between 2 and 4. Obviously, conventional heat sealing equipment was unable to apply the uniform desired pressure where the effective thickness of the plies was subject to such extreme variations. In most cases, the applied pressure was excessive where the number of plies or their combined thickness was the maximum and insufficient for the production of a satisfactory seal where the number of plies or their combined thickness was the minimum. This circumstance seriously interfered with the use of heat sealing in connection with gusseted bags and in general in the bonding of plies of thermoplastic sheet material of non-uniform thickness in the sealing region.

I have discovered that the outstanding problem may be solved in a remarkably simple manner.

It is an object of the present invention to improve heat sealing machines of the described general type.

It is another object of the present invention to provide a novel and improved machine and method for heat sealing thermoplastic sheet materials capable of forming seals or bonds of satisfactory quality regardless of variations in the thickness of the plies to be bonded in different portions of the heat sealing regions.

It is a further object of the present invention to provide a heat sealing machine, the pressure member of which comprises a pressure face constituted by a wall of an inflated or inflatable bag of elastic material adapted to readily conform to the surface contour of the plies of thermoplastic sheet material interposed between said pressure member and a sealing member.

The invention also contemplates a heat sealing machine and method, particularly adapted to sealing practices in accordance with the thermal impulse principle disclosed and claimed in my Patent No. 2,460,460 in which both the pressure, as well as the heat, applied to the plies of thermoplastic sheet material may be caused to vary during each sealing cycle as predetermined and correlated functions of time.

Other and further objects and advantages of the present invention will become apparent from the following description, taken in conjunction with the accompanying drawing, in which Fig. 1 is a side elevational view, somewhat diagrammatic and fragmentary in character and having parts in section, of a heat sealing machine embodying the principles of the present invention;

Fig. 2 is a section taken on line 2—2 of Fig. 1;

Fig. 3 is a view similar to Fig. 1, showing the machine in its operative or heat sealing position;

Fig. 4 is a side elevational view, also somewhat diagrammatic in character and having parts in section, of a modified embodiment of the invention;

Fig. 5 is a similar view illustrating the machine of Fig. 4 in its operative condition; and Fig. 6 is a diagrammatic view of a further modified embodiment of the invention.

Referring now more particularly to Figs. 1 and 2 of the drawing, reference numeral 10 denotes a sealing member or bar, having an operative or sealing face 11, adapted to be heated to or maintained at heat sealing temperatures. This may be accomplished, for example by forming the sealing member or bar 10 of metal of high heat conductivity and providing in an inner cavity 12 thereof a suitable electrical heating element or cartridge 13.

The sealing member 10 is arranged for cooperation with a pressure member or bar 14, mounted on a reciprocable support 15. Pressure member or bar 14 may be formed of any suitable material having strength, such as steel or some other metal.

On the lower face of pressure member 14 is mounted a hollow tubular member 16 formed of elastic material, such as natural or synthetic rubber having an inner space 17 therein. A material particularly suitable for the purposes of the present invention is a synthetic elastomer available in commerce under the name of silicone rubber due to the fact that this material is not affected adversely by the temperatures encountered in the operation of the machine. The lower exposed surface 18 of member 16 constitutes the operative or pressure-exerting face of the pressure member 14.

Great variations are possible in the character and shape of elastic member 16 in accordance with the specific sealing or bonding problem contemplated. It may be, for example, in the form of a sealed pad or bag of relatively thin-walled elastic material. Thus, good results are obtained by forming the elastic member 16 from a tube of silicone rubber of generally oval or somewhat flattened oval cross section which is cemented, clamped or otherwise secured to the lower face of pressure member or bar 14. The wall thickness of elastic member 16 is largely determined by the strength of the elastic material and by the desired sealing pressure. In general, the wall thickness is preferably the minimum that is compatible with the internal pressures thereby assuring maximum compliancy of the member.

A body of fluid is sealed in the inner space 17 of elastic member 16. This may be a compressible fluid, such as air or some other gas, or a non-compressible fluid, such as water or oil. It is also possible, however, to fill part of the said inner space with a non-compressible fluid and the remainder of said space with a compressible fluid.

To facilitate the introduction of the fluid into space 17, and the discharge of such fluid therefrom, if desired, it is preferred to mold a short metal tube 19 and 20 in the respective ends of the elastic member, valves 21 and 22 being respectively provided for the said tubes.

As the practical advantages obtainable by the present invention are particularly apparent when sealing plies of thermoplastic sheet material having different thicknesses in different portions of the sealing region, the operation of the machine will be described in connection with the sealing of a gusseted bag 23 of thermoplastic sheet material, comprising longitudinal seam 24 and gussets 25. It will be noted that in the compressed position of such bag, there will be four plies of the thermoplastic sheet material present in the regions of the gussets 25, three plies in the region of the longitudinal seam 24 and only two plies in the remainder of the sealing region.

The elastic member is assumed to be filled with a fluid, such as air, under suitable pressure through one or both tubes 19 and 20 and the inner space is then sealed by shutting off the corresponding valves 21 and 22. Of course, the same body of sealed-in fluid may be used indefinitely unless it is desired to change the fluid used or its internal pressure.

From the foregoing description, the operation of the heat sealing machine embodying the invention will be readily understood by those skilled in the art. Upon relative displacement of sealing member 10 and pressure member 14 towards each other by any suitable reciprocating mechanism (not shown), bag 23 will be compressed between sealing face 11 of sealing member 10 and the pressure face of pressure member 14 constituted by the face of wall 18 of elastic member or pad 16. As it will be noted by referring to Fig. 3, due to its flexible character, the face of elastic wall 18 will readily conform to the surface contour of compressed bag 23. In accordance with the elementary laws of hydrodynamics, the pressure applied to various portions of the sealing region will be substantially uniform, regardless of the number and the combined thickness of the plies in such portions. In other words, the applied pressure will be substantially the same in the regions of gussets 25, in the region of longitudinal seam 24, and also in the remainder of the sealing region. In this manner, a highly satisfactory seal or bond of the several layers or plies will be produced by the combined action of sealing heat and uniform pressure.

Instead of maintaining a sealed body of compressible or non-compressible fluid within inner space 17 of elastic pad 16, it is also possible to continuously pass a flow of such fluid under predetermined constant pressure through such space. This mode of operation may be carried into practice by introducing the fluid through tube 19 and discharging such fluid through tube 20, leaving, of course, both valves open to a greater or lesser extent, the pressure of the fluid and the extent to which the said valves are open determining the velocity of the flow. Maintaining a flow of suitable fluid, such as water, through inner space 17 of the pad will also produce a definite cooling effect on the sealed region which is particularly beneficial when the sealing member 10 is not continuously heated to heat sealing temperature but is of the thermal impulse type, such as is disclosed in my U. S. Patents 2,460,460 and 2,509,439. As most elastomers are relatively poor conductors of heat, small particles of material of good heat conductivity, such as metal powder may be incorporated into the elastic material of which the pad 16 is formed.

Figs. 4 and 5 illustrate a modified embodiment of the invention in which no separate reciprocating means are necessary for applying sealing pressure upon the plies of thermoplastic sheet material to be sealed or bonded together. Reference numeral 30 denotes the sealing member having a sealing face 31 adapted to be heated to heat sealing temperature in any suitable manner, such as by means of an electric heating cartridge 32. It is also possible, however, to employ a sealing member of the thermal impulse type, as disclosed and claimed in my aforesaid patents.

Pressure member 34 has cemented or otherwise secured to its lower face an inflateable pad 36 of elastic material, the lower wall surface 38 of which constitutes a yielding pressure-exerting face for the machine. Inner space 37 of pad 36 is in communication through a molded-in tube 40 and flexible hose 41 with nipple 42 of a three-way valve 43. Inlet nipple 44 of three-way valve 43 is connected to a suitable source of fluid under pressure through a control valve 45, and outlet nipple 46 of the said three-way valve is in communication with the exterior through a similar control valve 47.

In the operation of the machine layers or plies 48 and 49 of thermoplastic sheet material are interposed between sealing face 31 and pressure face 38 of the machine. (Fig. 4.) Elastic pad 36 is in its deflated position, since in the illustrated position of the three-way valve 43, inner space 37 of the pad is in direct communication with the external atmosphere through tube 40, hose 41, nipples 42 and 46 connected to each other by three-way valve 43 and normally open control valve 47.

Three-way valve is now turned in the clockwise direction by 90 degrees. (Fig. 5.) Fluid under pressure is now being introduced into elastic pad 36, through normally open control valve 45, inlet nipple 44, connected by the three-way valve to nipple 42, hose 41 and tube 40. The elastic pad will be inflated and its lower face 38 will exert sealing pressure upon the thermoplastic plies 48 and 49. Sealing or bonding of the said plies will occur as a result of the combined action of heat and pressure effective in the sealing region.

Upon the seal being completed, three-way valve 43 is turned counter-clockwise by 90 degrees, thus being returned into its position illustrated in Fig. 4. This will cause the internal pressure in elastic pad 36 being released into the atmosphere, causing deflation of the pad in a manner well understood. The sealed plies of thermoplastic sheet material are then removed from the machine.

Obviously, the rate at which the fluid pressure will be built up in pad 36 and is reduced is capable of adjustment in various ways, for example by adjusting the setting of valves 45 and 47. The fluid under pressure necessary for the operation of the machine may be obtained from various sources, such as from a small compressor or from a flask of compressed air or other gas provided with a pressure-reducing valve. In the simplest case the fluid under pressure may be water, drawn from the water mains under suitable pressure. In this manner, the further advantage of cooling the pressure-applying member is realized.

It will be readily appreciated that the modified embodiment of the invention just described is extremely simple and inexpensive both to build, as well as to operate, due to the fact that the usual reciprocating mechanism, generally comprising an electric motor, a reduction gear, and a clutch, is completely dispensed with. However, it is also within the contemplation of the invention to combine a suitable reciprocating mechanism with members 30 and 34 whereby relative displacement of the said members with respect to each other is produced in addition to the relative displacement of sealing face 31 and pressure-exerting face 38 caused by inflation and deflation of elastic pad 36.

A further modified embodiment of the present invention which is particularly advantageous in combination with sealing members of the thermal impulse type is diagrammatically illustrated in Fig. 6.

Reference numeral 50 generally denotes a sealing member of insulating material having a heater element 51 in the form of a strip or band of a metal of high specific resistance mounted thereon by means of bolts 52 and nuts 53. The heater element constitutes the operative or sealing face of member 50. Through bolts and nuts 52, 53, the ends of heater element 51 are respectively connected to the ends of secondary or low-voltage winding 54 of a step-down transformer 55. The primary or high-voltage winding 56 is connected through a rheostat 56a and the normally open contacts 57 of a time delay switch 58 to a source of alternating current of power line frequency indicated by terminals 59 and 60. The time delay switch 58 further comprises an actuating plunger 61, depression of which initiates operation of the switch, and a control screw 62 for adjustment of the time delay period. This switch is of the type that, upon its operation being initiated, it will immediately close its operating contacts and will automatically open such contacts a predetermined and adjustable time delay period thereafter. As time delay switches of the described general type are well known to those skilled in the art and do not form part of the present invention, the switch has been merely diagrammatically indicated in the drawing. For structural details of suitable switches reference may be had, for example, to my Patent 2,479,375.

Pressure member 63 is carried by a reciprocable support 64. On the lower surface of the pressure member there is mounted an inflatable pad 65 of elastic material having an inner space 66 therein. The lower wall surface of the said pad constitutes a yielding pressure-exerting face 67 of the machine.

Pressure fluid may be introduced into the inflateable pad 65 and may be discharged therefrom under the control of a slide valve 68 comprising a stationary portion 69 and a movable portion or slide 70. Slide 70 is normally held against a projecting portion 71 of element 69 by a spring 72 and is capable of downward displacement upon solenoid 73 being energized, which will then attract core 74 and will exert a downward displacement on the slide through pull rod 75 until the lower surface of the slide hits against stop 76.

The stationary portion 69 of slide valve 68 is provided with three ducts, 77, 78 and 79, passing therethrough. Of these, duct 77 is connected to a source of fluid under pressure (not shown) through a conduit 80 and adjustable valve 81, duct 78 is connected to the inner space 66 of elastic pad 65 through two short metal conduits 82, 83 and an interposed flexible tube 84, and duct 79 is in communication with the external atmosphere through a conduit 85 and an adjustable valve 86. Slide portion 70 of slide valve 68 is provided with a semicircular duct 87. It will be noted that in the upper or rest position of slide valve 68 (see Fig. 6), ducts 79 and 78 are connected with each other by means of semi-circular duct 87, whereas in the lower or operative position of the slide valve ducts 78 and 77 are connected with each other by means of the said semi-circular duct.

One end of solenoid 73 is directly connected to terminal 60 of the alternating current power line, while the other end of the said solenoid may be connected to the other terminal 59 of the power line upon actuation of the normally open contacts 88 of time delay switch 89, having an actuating plunger 90 and a control knob 91 which serves for adjustment of the time delay period. Time delay switch 89 is of a type similar to that of switch 58. In other words, it will close its contacts 88 upon depression of actuating plunger 90 and will automatically open the said contacts a predetermined time delay period thereafter.

The actuating mechanism for the time delay switches comprises a horizontal bar 91a mounted on pressure member 63 from which depend two actuating rods 92 and 93, carrying adjustable screws 94 and 95, respectively, at their lower ends. Upon downward displacement of pressure member 63, screws 94 and 95 will engage and then depress actuating plungers 61 and 90 of time delay switches 58 and 89, respectively, initiating the operation thereof.

From the foregoing description, the operation of this modified embodiment of the invention will be readily understood. Plies or layers 95 and 96 of thermoplastic sheet material are introduced between pressure member 63 and sealing member 50 and the reciprocating mechanism is actuated, causing downward displacement of member 63 towards the other member. During this displacement screw 95 at the end of rod 93 will strike against plunger 90 of time delay switch 89.

The time delay switch will close its contacts 88, thus completing the energizing circuit of solenoid 73, which will exert a downward pull on core 74 and through pull-rod 75 will displace slide 70 into its lower or operating position against the biasing force of spring 72 until the lower face of the slide strikes against stop 76.

The inner space 66 of inflatable pad 65 is now connected to the source of fluid pressure through conduit 82, flexible tube 84, conduit 83, ducts 78, 87 and 77, conduit 80 and valve 81. Pad 65 will be inflated at a predetermined rate, as determined by the extent to which valve 81 is opened and its yielding pressure-exerting face 67 will place plies 95 and 96 to be bonded together under pressure.

Sometime during downward displacement of pressure member 63, screw 94 at the lower end of actuating rod 92 will strike against actuating plunger 61 of time delay switch 58. Contacts 57 of the said switch will be closed, completing the circuit of primary winding 56 of transformer 55 with the power line 59, 60. Upon the transformer being energized, its secondary or low voltage winding 54 will energize heater element 51 of sealing member 50. Due to its extremely low heat capacity, the said heater element will be heated to heat sealing temperature practically instantaneously. As a result of the combined action of sealing heat and pressure, plies 95, 96 will be bonded together.

A short predetermined period thereafter time delay switch 58 will automatically open its contacts 57, opening the circuit of transformer 55. The generation of heat in heater element 51 will be discontinued and the seal formed is permitted to cool and consolidate under pressure whereby a very strong and sound bond is obtained.

Another predetermined period thereafter, time delay switch 89 will automatically open its contacts 88, opening the circuit of solenoid 73. Slide 70 of slide valve 68 will be returned into its rest position by spring 72. The inner space 66 of inflated pad 65 is now connected to the external atmosphere through conduit 82, flexible tube 84, conduit 83, ducts 78, 87, 79, conduit 85 and control valve 86. The pad 65 will be deflated at a rate which is adjustable by the setting of control valve 86. This will remove the pressure from the sealed layers. Finally, pressure member 63 is displaced upwardly by the reciprocating mechanism thereby resetting the machine for the next bonding operation.

In the foregoing, a preferred procedure for operating the machine has been described. It is to be observed, that the machine of the invention is extremely flexible in its operation and may be preset for carrying out a great variety of sealing operations of different type. This is due to the fact that both the heating of the sealing face 51, as well as the pressure applied by the pressure-exerting face 67 are individually adjustable as independent functions of time during each sealing cycle. This provides great advantages when sealing thermoplastic plies of different composition and thickness.

The time when pressure application is started is adjustable by screw 94, the length of time for which pressure is applied is adjustable by control knob 91. The rates at which the pressure is increased and decreased are adjustable by valves 81 and 86, respectively.

The time when heat application is started is adjustable by screw 94, the length for which heat is applied is adjustable by control knob 62. The amount of heat generated during the unit of time is adjustable by the setting of rheostat 56a. In general, it is preferred to have the period of pressure application extend beyond the period of heat application so that the seal formed is being cooled and consolidated while still under pressure.

In Fig. 6 a simplified form of sealing member of the thermal impulse type has been shown for the sake of simplicity. Further improved results may be obtained by using the sealing members of the thermal impulse type disclosed and claimed in my Patent No. 2,509,439 and in my co-pending application Serial No. 174,074, filed July 15, 1950, now Patent No. 2,574,095.

While there has been shown and described what is at present considered to be the preferred embodiments of the present invention, it will be obvious to those skilled in the art that various modifications and substitutions of equivalents may be made without departing from the teachings of the invention.

I claim:

1. A heat sealing machine comprising, in combination, a stationary sealing member having a sealing face adapted to be heated to heat sealing temperatures, and a pressure member therefor, said pressure member including an inflatable pad of elastic material having a surface mounted on a stationary support and another surface constituting a yielding pressure-exerting face whereby upon inflation of said pad uniform sealing pressure may be applied upon plies of thermoplastic sheet material interposed between said sealing face and said pressure-exerting face.

2. A heat sealing machine comprising, in combination, a stationary sealing member, a pressure member therefor including an inflatable pad of elastic material having a surface mounted on a stationary support and another surface constituting a yielding pressure-exerting face, means for heating the operative face of said sealing member to heat sealing temperatures, and means for inflating said pad thereby applying uniform sealing pressure upon plies of thermoplastic sheet material interposed between said sealing face and said pressure-exerting face.

3. A heat sealing machine comprising, in combination, a stationary sealing member including a sealing face adapted to be heated to heat sealing temperatures, a pressure member therefor including a yielding pressure-exerting face constituted by a surface of an inflatable pad of elastic material having another surface mounted on a stationary support, means for introducing fluid under pressure into said pad thereby to inflate the pad and to apply sealing pressure upon plies of thermoplastic sheet material interposed between said sealing face and said pressure-exerting face, and means for discharging said fluid from said pad thereby to release said sealing pressure.

4. A heat sealing machine comprising, in combination, a stationary sealing member including a sealing face adapted to be heated to heat sealing temperatures, a pressure member therefor including a yielding pressure-exerting face constituted by a surface of an inflatable pad of elastic material, a stationary support for mounting the opposed surface of said pad, valve means for introducing fluid under pressure into said pad thereby to inflate the pad into pressure-applying relation with said sealing face and to discharge such fluid from the pad thereby to release the applied pressure, and means for controlling the pressure of said fluid.

5. A heat sealing machine comprising, in combination, a stationary sealing member including a sealing face adapted to be heated to heat sealing temperatures, a pressure member therefor including a yielding pressure-exerting face constituted by a surface of an inflatable pad of elastic material, a stationary support for mounting the opposed surface of said pad, means for introducing fluid under pressure into said pad thereby to inflate said pad into pressure-applying relation with said sealing face and to discharge such fluid from the pad thereby to release the applied pressure, and means for controlling the pressure of said fluid prevailing within said pad as a predetermined function of time.

NICHOLAS LANGER.

References Cited in the file of this patent

UNITED STATES PATENTS

| Number | Name | Date |
|---|---|---|
| 2,018,736 | Norris | Oct. 29, 1935 |
| 2,108,859 | Kamborian | Feb. 22, 1938 |
| 2,460,460 | Langer | Feb. 1, 1949 |
| 2,509,439 | Langer | May 30, 1950 |
| 2,520,978 | Super | Sept. 5, 1950 |
| 2,524,932 | Schulman | Oct. 10, 1950 |
| 2,550,006 | Dreyfus | Apr. 24, 1951 |
| 2,574,094 | Fener et al. | Nov. 6, 1951 |